(12) United States Patent
Bachl et al.

(10) Patent No.: US 7,058,250 B2
(45) Date of Patent: Jun. 6, 2006

(54) ILLUMINATION ARRANGEMENT

(75) Inventors: Bernhard Bachl, Falkensee (DE); Mario Wanninger, Barbing (DE)

(73) Assignee: Osram GmbH, Munich (DE)

( * ) Notice: Subject to any disclaimer, the term of this patent is extended or adjusted under 35 U.S.C. 154(b) by 496 days.

(21) Appl. No.: 09/890,411

(22) PCT Filed: Nov. 30, 2000

(86) PCT No.: PCT/DE00/04270

§ 371 (c)(1),
(2), (4) Date: Dec. 4, 2001

(87) PCT Pub. No.: WO01/40707

PCT Pub. Date: Jun. 7, 2001

(65) Prior Publication Data

US 2002/0136502 A1    Sep. 26, 2002

(30) Foreign Application Priority Data

Nov. 30, 1999   (DE) ................................. 199 57 611

(51) Int. Cl.
*G02B 6/00* (2006.01)
(52) U.S. Cl. ........................... 385/15; 385/92; 385/901
(58) Field of Classification Search ................... 385/15, 385/88, 901, 92, 134; 362/23, 26, 27, 28, 362/29, 30, 551, 555, 362, 457
See application file for complete search history.

(56) References Cited

U.S. PATENT DOCUMENTS

| 3,262,224 | A |   | 7/1966 | Hardesty |
|---|---|---|---|---|
| 5,453,855 | A | * | 9/1995 | Nakamura et al. ............ 349/58 |
| 6,259,082 | B1 | * | 7/2001 | Fujimoto et al. ............. 362/26 |

FOREIGN PATENT DOCUMENTS

| DE | G9101437.9 |   | 6/1991 |
|---|---|---|---|
| DE | 19700472 A1 |   | 7/1998 |
| DE | 29805006 U1 |   | 7/1998 |
| DE | 19715053 A1 | * | 10/1998 |
| EP | 0884525 | * | 12/1998 |
| EP | 1030208 A2 |   | 8/2000 |
| EP | 1039216 A1 |   | 9/2000 |
| JP | 07287126 A |   | 10/1995 |
| JP | 10188641 A |   | 7/1998 |
| JP | 11024071 A |   | 1/1999 |
| JP | 11038411 A |   | 2/1999 |

\* cited by examiner

*Primary Examiner*—Jay Patidar
(74) *Attorney, Agent, or Firm*—Cohen, Pontani, Lieberman & Pavane

(57) ABSTRACT

The invention relates to a lighting device, comprising a light guide (11; 31; 43), a light source (12; 32, 33; 41), which couples the light that is emitted into the light guide, and a support (10; 20, 21; 22; 23; 30, 35, 38; 40, 42) in the form of a shell, consisting of several interconnected sub-shells which enclose the light guide, at least in the area in which the light should be deviated. The invention also relates to a method for producing a lighting device.

21 Claims, 2 Drawing Sheets

US 7,058,250 B2

ILLUMINATION ARRANGEMENT

CROSS REFERENCE TO RELATED APPLICATIONS

This application claims priority to International Application No.: PCT/DE00/04270 which was published Jun. 7, 2001. This application further claims priority to German patent application 199957611.4 filed 30 Nov. 1999.

TECHNICAL FIELD OF THE INVENTION

The invention relates generally to an illumination arrangement having an optical waveguide, a light source, coupled thereto, and a mount for the optical waveguide.

BACKGROUND OF THE INVENTION

Known illumination arrangements wherein the light source comprises a light-emitting diode or a laser diode, is often used for general illumination or background illumination for liquid-crystal displays (LCD). Herein, the optical waveguide directs light, emitted by the coupled light source, out from the optical waveguide at a waveguide end or at a centrally located window. In the latter example, the surface of the optical waveguide is structured in the window region, e.g. by knobs, grooves, or by some other roughening in order to homogenize the light exit. The optical waveguides are composed of transparent material, such as epoxy resin or polymethyl methacrylate (PMMA). In the course of guiding the light and its internal reflections, it is desirable to have as little light loss as possible, while maintaining cost-effective production and practical and simple assembly.

A related art embodiment is shown in FIG. 5. Here, a light-emitting diode 50 (LED) is coupled into an optical waveguide 51 which in turn is plugged into a mount 52a, 52b. The mount 52 and LED 50 are mounted on a printed circuit board (PCB) 53. The light emitted by the LED 50 is internally reflected at bevel 54. For production engineering reasons, in particular in favor of ease of assembly, the bevel 54 is not covered with a reflective material. During the internal reflection of light at bevel 54, angled preferably at 45°, light necessarily emerges from the optical waveguide. This light is lost for the envisaged application since it is not guided any further in the optical waveguide. On the other side, the mounts 52a, 52b simultaneously serve as reflectors which prevent light from emerging from the optical waveguide 51 on these sides. When observing the surface of the optical waveguide from the direction B, for example when the optical waveguide is embodied as LCD background illumination, some regions on the optical waveguide surface appear brighter than others (hot spots) as a result of the light internal reflection at the boundary surface 54 and the direct radiation of the light source. Hot spots are bright surface regions which appear in a light exit window and cannot be corrected by the surface configuration of the optical waveguide in the light exit window. Producing a special reflector for the inclined surface 54 in the form of an injection-molded part is costly and undesirable.

SUMMARY OF THE INVENTION

An advantage of the present invention is set out in a cost effective and easy to use illumination arrangement which can be produced at reduced engineering and manufacturing costs, be designed for high replication, and preserve, maximize and/or increase board space for component mounting.

These and other advantages of the present invention are accomplished by an illumination arrangement, comprising: an optical waveguide; at least one light source for emitting light into the waveguide, the at least one light source coupled to the waveguide; and a housing defining a cavity for accommodating the waveguide and at least one light source therein, the housing further defining contiguous upper, lower and side walls, the upper and lower walls having reflective internal surfaces, and the upper wall defining a window from which light emitted by the waveguide escapes the housing. In addition, these and other advantages of the present invention are accomplished by a method for producing a light emitting component, comprising the steps of: forming a housing having a cavity defined by cooperating bottom, side and top walls, said walls having internal surfaces defining said cavity and external surfaces defining an outer perimeter of said housing, said internal surfaces being light reflecting, said walls being opaque, and said top walls defining rounded corners and a window; forming at least one light emitting source; forming an optical waveguide; forming a printed circuit board having means for facilitating communication of electricity to elements mounted thereon; mounting said waveguide within said cavity; mounting said at least one light emitting source on said board such that electricity is communicated to said light emitting source; mounting said housing over said at least one light emitting source, such that said source is coupled to said waveguide and light emitting from said source is transmitted by said waveguide and out said window.

BRIEF DESCRIPTION OF THE SEVERAL VIEWS OF THE DRAWINGS

The novel features believed characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
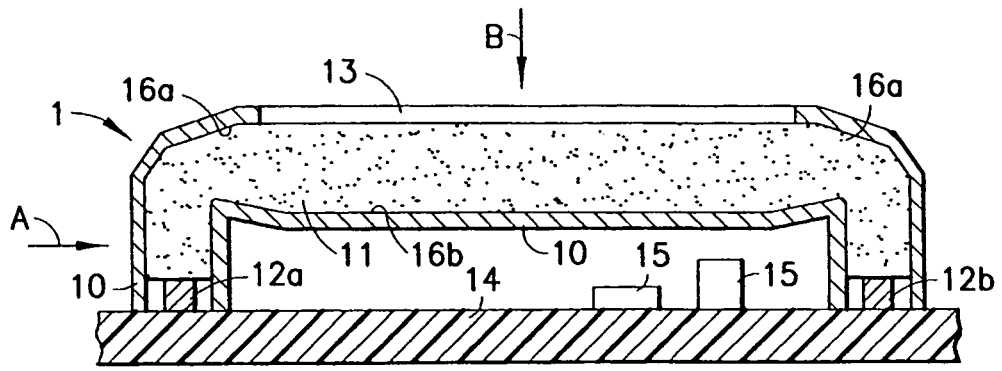
FIG. 1 shows a diagrammatic cross section through an illumination arrangement according to the invention.

FIG. 1 shows an illumination arrangement 1 in a cross-sectional illustration. The arrangement comprises a mount 10 or an optical waveguide 11, into which one or more light sources 12a, 12b feed light. The light sources 12 are preferably light-emitting diodes (LED) or laser diodes, but other light sources such as incandescent lamps are also possible. The light source 12 and the mount 10 are mounted on a printed circuit board 14. The mount 10 surrounds the optical waveguide 11 in shell form in the regions in which the light has to be deflected and guided. In order to introduce the optical waveguide into the shell, and to be able to mount it, the mount 10 is formed from a plurality of shell elements. In the example of FIG. 1, the mount 10 contains on its top side a window 13 through which an observer B can observe the optical waveguide or the light can be coupled out. The window 13 in the mount 10 is configured in such a way that the illumination arrangement can serve as an element of background illumination for liquid-crystal displays.

In accordance with FIG. 1, the mount 10 for the optical waveguide 11 simultaneously has the main function of a reflector with the reflector surfaces 16a, 16b, with the aid of which the light beams can be deflected without relatively large light losses arising. The deflection angle is inherently arbitrary, but 90° here. Depending on technical requirements and specifications, the optical waveguide 11 with the mount 10 is constructed in such a way that the optical losses and/or the hot spots are minimized. The mount 10 is shaped in the light deflection region and in the window region 10, such that light can emerge diffusely through the window 13. The upper reflector surface 16a can be multiply angled or rounded. With respect to the optical waveguide, the lower reflector surface 16b is convexly formed or expanded in order that light cannot emerge in a concentrated manner at one location. Both, the optical waveguide 11 and the mount 10 can be produced as injection-molded parts. Transparent material, e.g. PMMA, is used as the optical waveguide. The mount 10 is typically opaque to light and reflective at its inner surfaces in order to reflect back into the optical waveguide the light which emerges at the deflection points of the optical waveguide.

Figure 2A:
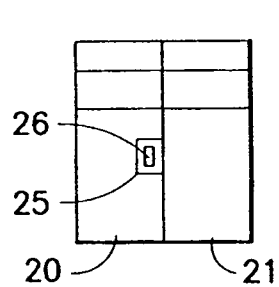
FIGS. 2a and 2b show side views of a mount for the optical waveguide.

According to the invention, the mount 10 is designed in shell form and contains at least two shell elements. FIG. 2 shows a side view of the arrangement in accordance with FIG. 1 from viewing direction A. In accordance with FIG. 2a), the mount contains for the optical waveguide two shell elements 20 and 21, which are designed largely symmetrically with respect to the central line. In the light propagation direction, the optical waveguide has a largely rectangular cross section. During assembly, the optical waveguide is firstly introduced laterally into one of the two shell elements 20 or 21 and then enclosed by the other half-shell 21 or 20, respectively, at the regions not yet protected.

The two half-shells 20 and 21 are connected by a snap-action device 25, 26. In this case, a lug 25 fixed to the half-shell 21 and having an opening is pushed over a knob 26 fixed to the other half-shell 20. However, the two half-shells can also be connected in any other form which ensures that the two half-shells enclose the optical waveguide. In addition to a releasable connection such as that using the snap-action devices 25, 26, fixed connections, for example by bonding, are also appropriate. In order to prevent the situation where gaps arising at the abutting edge of the two half-shells 20 and 21, possibly due to material tolerances or due to an aging behavior, lead to the coupling-out of light, it is possible to fold the two shell elements 20 and 21 at their abutting edge, so that the shell elements overlap at the fold and become optically opaque.

Figure 2B:
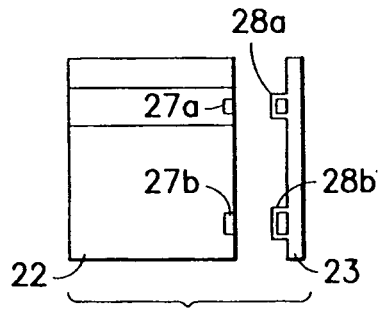

FIG. 2b shows another arrangement for the two shell elements. In this case, the optical waveguide is firstly introduced from the side into a shell element 22, which encloses the optical waveguide to an extent such that only a cover 23 has to be laterally placed in order to enclose the optical waveguide in the light-guiding region. In this exemplary embodiment, the connection between the shell elements 22 and 23 is effected by a plurality of snap-action devices 27, 28. Projecting knobs are arranged on the shell element 22 and the openings in the lugs 28 can latch into said knobs. The advantage of this arrangement is the releasability of the mount arrangement. In an embodiment of FIG. 2a, too, the shell elements 22 and 23 can be provided with a fold, so that no light emerges at the abutting surface.

In the arrangement in accordance with FIG. 1, it is possible to feed in light from only one light source 12. Preferably, however, a plurality of light sources 12a, 12b are provided, which, as in FIG. 1, feed light into the optical waveguide from both sides. What is more, further light sources may be arranged perpendicularly to the plane of the drawing. This makes it possible to observe a high light intensity at the window 13. With the arrangement in accordance with FIG. 1, it is possible for the light that is to be couple out, or the observation window 13, to be arranged remote from the light source 12. The optical waveguide 11 and the shell mount 10 can be produced extremely favorably by virtue of the production of injection-molded parts, at the same time the light guidance by virtue of the form of the optical waveguide channels and of the shell mount designed as reflectors being effected so optimally that a maximum of light can be utilized for the illumination purposes. The construction in the form of a bridge, means that it is possible to produce a space-saving arrangements wherein, below the mount 10, in the free space toward the circuit board 14, components 15 can be arranged on the circuit board.

Figure 3:
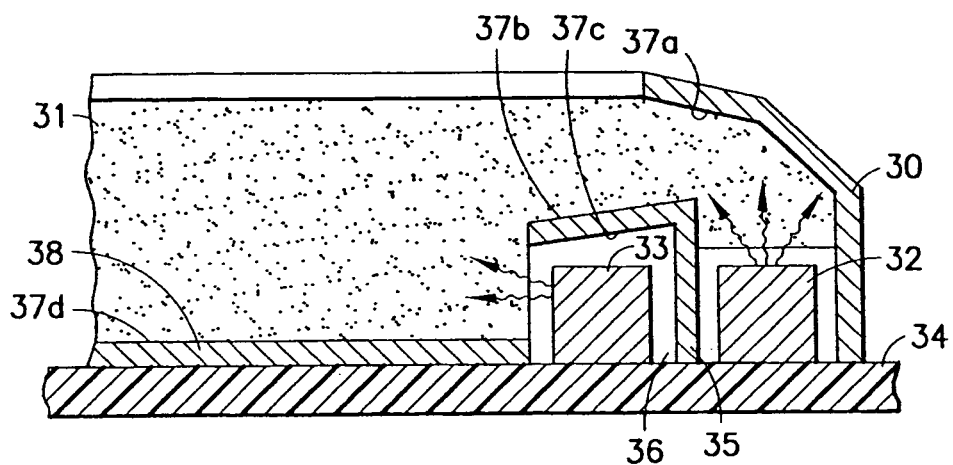
FIG. 3 shows a diagrammatic cross section of a special embodiment of the invention.

FIG. 3 shows a partial cross section of a further embodiment of the invention. This provides a shell-type mount 30 for the optical waveguide 31, which in this case are mounted by their side 38 in a planar manner on the circuit board 34. In contrast to FIG. 1, the arrangement contains not only an upwardly radiating LED 32 but a chamber 36 separated from the latter by a partition 35, arranged in which chamber is an LED or laser diode 33 radiating sideways over the edges. In this construction, a bridge arrangement as illustrated in FIG. 1 is not provided. The advantage of the arrangement in accordance with FIG. 3 is that the optical power coupled into the optical waveguide can be considerably higher than in the case of the arrangement in FIG. 1. Here, too, the inner surfaces 37 of the mount 30 serve as reflectors.

Figure 4A:
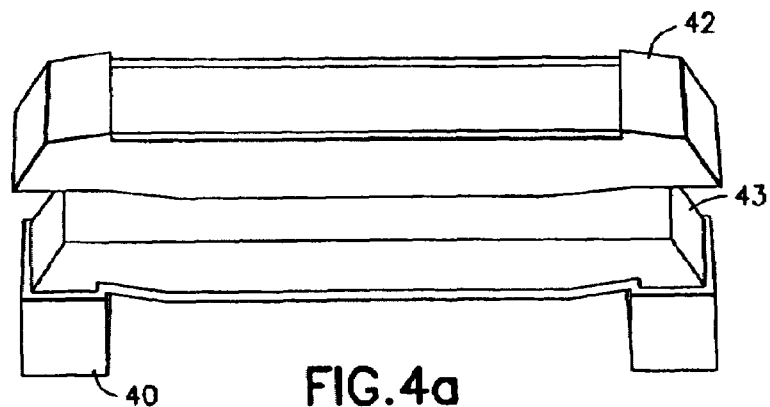
FIGS. 4a and 4b shows a further, partially perspectively illustrated embodiment of the invention.
Figure 4B:
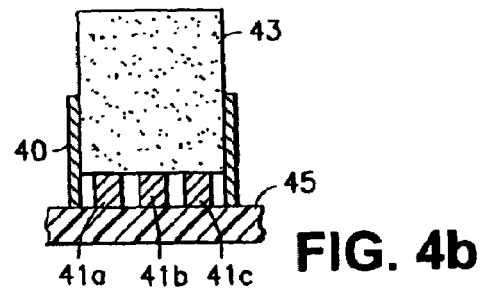
Figure 5:
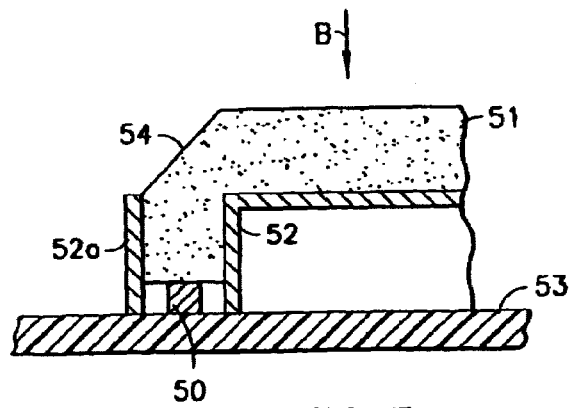
FIG. 5 shows a diagrammatic cross-sectional illustration of previously used illumination arrangements.

FIG. 4 shows a further, partially perspective exemplary embodiment of the invention, in which the shell elements of the mount are not separated vertically, as illustrated in FIG. 2, but horizontally. In this embodiment, the optical waveguide 43 is plugged into the lower shell element 40 from above and subsequently covered by the upper shell element 42. The lower shell element is mounted on the PCB 45. The upper shell element can be connected to the lower shell element in the manner described with reference to FIG. 2. In the exemplary embodiment, 3 LEDs 41a to 41c are provided on each circuit-board side of the optical waveguide, but there may also be more or fewer individual light sources.

Furthermore, there are a multiplicity of possibilities for producing optical waveguides and associated shell elements which enable virtually arbitrary variation for the coupling-in and coupling-out of light. This is because the optical waveguides are largely completely covered by the shell type mount, except for the coupling-in and coupling-out regions, the inner surfaces of the mount serving as reflector surfaces.

We claim:

1. An illumination arrangement, comprising:
   an optical waveguide;
   at least one light source for emitting light into the optical waveguide, the at least one light source being coupled to the optical waveguide; and
   a housing formed as a shell from a plurality of interconnected shell elements which define a cavity for enclosing therein (i) the optical waveguide at least in regions in which the light is to be deflected and (ii) at least one light source, said shell having upper, lower and side walls;

wherein at least one of said shell walls has a reflective internal surface in regions corresponding to regions of the optical waveguide in which light from said at least one light source is to be deflected, and one of said shell walls defines a window from which light emitted by the optical waveguide escapes the housing.

2. The arrangement according to claim 1, wherein said housing defines a bridge over a second cavity.

3. The arrangement according to claim 2, wherein said housing is mounted on a printed circuit board and the second cavity is between said housing and said board, and further comprising means for facilitating electrical communication between an external power source and said at least one light source via said printed circuit board.

4. The arrangement according to claim 3, further comprising components mounted on said printed circuit board within said second cavity.

5. The arrangement according to claim 1, wherein said housing is mounted on a printed circuit board, and further comprising means for facilitating electrical communication between an external power source and said at least one light source via said printed circuit board.

6. The arrangement according to claim 1, wherein a surface of said side walls facing said cavity is reflective.

7. The arrangement according to claim 1, wherein said housing comprises a plurality of mating parts.

8. The arrangement according to claim 7, wherein said plurality of mating parts snap fit together.

9. The arrangement according to claim 7, wherein said parts are injection molded.

10. The arrangement according to claim 1, wherein said lower wall is convex.

11. The arrangement according to claim 1, wherein said upper wall is angled.

12. The arrangement according to claim 1, wherein said housing further comprises means for accommodating a plurality of light emitting sources such that emission from said sources are caused to emit in different directions.

13. The arrangement according to claim 12, wherein said waveguide emits a combination of emissions from said plurality of light emitting sources.

14. The arrangement according to claim 1, wherein said at least one light source comprises a light emitting diode.

15. The arrangement according to claim 1, wherein said at least one light source comprises a laser diode.

16. An illumination arrangement, comprising:
an optical waveguide;
at least one light source for emitting light into the optical waveguide, the at least one light source coupled to the optical waveguide; and
a housing formed as a shell from a plurality of interconnected shell elements which define a cavity for enclosing therein (i) the optical waveguide at least in regions in which the light is to be deflected and (ii) at least one light source, said shell having upper, lower and side walls, wherein the housing comprises a plurality of mating parts;
wherein at least one of said shell walls has a reflective internal surface for deflecting light from said at least one light source, and one of said shell walls defines a window from which light emitted by the optical waveguide escapes the housing, and
wherein said plurality of mating parts cooperate to form an opaque overhang where said parts join.

17. An illumination arrangement, comprising:
an optical waveguide; at least one light source for emitting light into the optical waveguide, the at least one light source coupled to the optical waveguide; and
a housing formed as a shell from a plurality of interconnected shell elements which define a cavity for enclosing therein (i) the optical waveguide at least in regions in which the light is to be deflected and (ii) at least one light source, said shell having upper, lower and side walls, wherein the housing comprises a plurality of mating parts;
wherein at least one of said shell walls has a reflective internal surface for deflecting light from said at least one light source, and one of said shell walls defines a window from which light emitted by the optical waveguide escapes the housing, and
wherein said parts are approximately inversely symmetrical.

18. A method for producing a light emitting component, comprising the steps of:
forming a housing as a shell from a plurality of shell elements and defining a cavity, said shell having bottom, side and top walls, at least one of said shell walls having a reflective internal surface, and said top wall defining a window;
mounting an optical waveguide within said cavity;
mounting at least one light emitting source within said cavity such that said at least one light emitting source is coupled to said optical waveguide such that light emitted from said source is reflected by said internal surfaces in regions corresponding to regions of the optical waveguide in which light from said at least one light emitting source and transmitted by said optical waveguide out said window.

19. The method according to claim 18, further comprising the step of:
mounting said housing on a printed circuit board such that said lower wall and said printed circuit board cooperate to define a second cavity; and
mounting components within said second cavity on said board.

20. The method according to claim 18, wherein said lower wall is convex and said plurality of shell elements comprise a plurality of snap fitted components which mate to form said housing.

21. An illumination arrangement, comprising:
an optical waveguide;
at least one light source for emitting light into the optical waveguide, the at least one light source being coupled to the optical waveguide;
a housing formed as a shell from a plurality of interconnected shell elements which define a cavity for enclosing therein (i) the optical waveguide at least in regions in which the light is to be deflected and (ii) at least one light source, said shell having upper, lower and side walls, said housing being mounted on a printed circuit board and wherein a second cavity is between said housing and said board; and
means for facilitating electrical communication between an external power source and said at least one light source via said printed circuit board;
wherein at least one of said shell walls has a reflective internal surface in regions corresponding to regions of the optical waveguide in which light from said at least one light source is to be deflected, and one of said shell walls defines a window from which light emitted by the optical waveguide escapes the housing, and wherein said at least one light source radiates in a direction that is substantially perpendicular with respect to a main surface of the printed circuit board.

* * * * *